(12) United States Patent
Long

(10) Patent No.: US 10,897,193 B2
(45) Date of Patent: Jan. 19, 2021

(54) DIRECT CONDUCTION CONTROL FOR POWER FACTOR CORRECTION CIRCUIT

(71) Applicant: TEXAS INSTRUMENTS INCORPORATED, Dallas, TX (US)

(72) Inventor: William James Long, Cork (IE)

(73) Assignee: Texas Instruments Incorporated, Dallas, TX (US)

(*) Notice: Subject to any disclaimer, the term of this patent is extended or adjusted under 35 U.S.C. 154(b) by 47 days.

(21) Appl. No.: 16/216,452

(22) Filed: Dec. 11, 2018

(65) Prior Publication Data

US 2019/0312506 A1 Oct. 10, 2019

Related U.S. Application Data

(60) Provisional application No. 62/654,904, filed on Apr. 9, 2018.

(51) Int. Cl.
*H02M 1/42* (2007.01)
*H02M 1/14* (2006.01)
*H02M 1/08* (2006.01)
*H02M 3/335* (2006.01)

(52) U.S. Cl.
CPC ........... *H02M 1/4208* (2013.01); *H02M 1/08* (2013.01); *H02M 1/14* (2013.01); *H02M 3/33569* (2013.01)

(58) Field of Classification Search
None
See application file for complete search history.

(56) References Cited

U.S. PATENT DOCUMENTS

| | | | |
|---|---|---|---|
| 2013/0250621 A1* | 9/2013 | Manor | H02M 1/14 363/16 |
| 2014/0043877 A1* | 2/2014 | Ishii | H02M 1/4225 363/84 |
| 2019/0052175 A1* | 2/2019 | Gritti | H02M 1/4241 |

* cited by examiner

*Primary Examiner* — Jue Zhang
*Assistant Examiner* — Henry E Lee, III
(74) *Attorney, Agent, or Firm* — Lawrence J. Bassuk; Charles A. Brill; Frank D. Cimino

(57) ABSTRACT

A system includes a switching power supply that includes switch devices configured to provide a regulated output voltage based on an input voltage. A controller is configured to control the switch devices based on a power demand signal. A direct conduction avoidance circuit is configured to provide a direct conduction avoidance signal based on the regulated output voltage exceeding a direct conduction threshold voltage. The direct conduction avoidance signal is combined with a compensation signal to provide the power demand signal to the controller. An override circuit is configured to disable the direct conduction avoidance circuit based on the input voltage of the switching power supply being below an override threshold voltage.

19 Claims, 11 Drawing Sheets

DIRECT CONDUCTION CONTROL FOR POWER FACTOR CORRECTION CIRCUIT

CROSS REFERENCE TO RELATED APPLICATIONS

This application claims the benefit of U.S. Provisional Patent Application 62/654,904 filed on 9 Apr. 2018, and entitled NOTCH FILTER FOR POWER CORRECTION FACTOR TOPOLOGY WITH LOW BULK CAPACITOR, the entirety of which is incorporated by reference herein.

TECHNICAL FIELD

This disclosure relates to direct conduction control for a power factor correction circuit.

BACKGROUND

A transition mode boost circuit is a popular choice for power factor correction (PFC) and regulation circuits for various applications. An aluminum electrolytic capacitor is typically used as the energy storage element on the output of the PFC/regulation circuit. It may be desirable to replace the aluminum electrolytic bulk capacitors with film capacitors. Aluminum electrolytic capacitors are volumetrically efficient relative to other high voltage capacitor types but may fail due to electrical or thermal overstress. When aluminum electrolytic capacitors fail, the electrolytic may leak and as a result, it may damage other surrounding components in the system. Film capacitors tend to have higher lifetimes and do not have the same type of electrolytic which could damage surrounding components. However, due to the much lower volumetric efficiency of film capacitors, using a film capacitor of approximately equal volume to the aluminum electrolytic may result in far less bulk capacitance at the regulator output. A reduced bulk capacitance may in turn cause a much larger ripple voltage on the bulk capacitor output and hence also requires a higher output voltage set point to avoid direct conduction from the input line voltage to the output capacitor a high line input voltage.

For example, a normal boost regulator circuit with greater than 0.5 uF/W of bulk output capacitance would typically have an output voltage set point of approximately 400V with approximately 5-10V (peak) of ripple voltage. Therefore, the minimum output voltage of 390V is greater than the peak of the rectified line voltage at max input voltage avoiding a direct conduction condition (e.g., 264 VAC input->373V peak input voltage). With reduced bulk capacitance (e.g., as low as 100 nF/W), a ripple voltage of 100V or more can be expected. Therefore, the bulk output voltage has to be increased even more to avoid direct conduction in normal operation (e.g., under high line conditions). The higher ripple voltage also causes problems for the control scheme.

SUMMARY

In one example, a system includes a switching power supply that includes switch devices configured to provide a regulated output voltage based on an input voltage. A controller is configured to control the switch devices based on a power demand signal. A direct conduction avoidance circuit is configured to provide a direct conduction avoidance signal based on the regulated output voltage exceeding a direct conduction threshold voltage. The direct conduction avoidance signal is combined with a compensation signal to provide the power demand signal to the controller. An override circuit is configured to disable the direct conduction avoidance circuit based on the input voltage of the switching power supply being below an override threshold voltage.

In another example, a circuit includes a controller including outputs coupled to switching devices of a power supply including an input voltage input coupled to an input voltage. The controller includes a power demand input. A direct conduction avoidance circuit includes inputs coupled to the power supply and a direct conduction threshold voltage. The direct conduction avoidance circuit includes a direct conduction output coupled to the power demand input of the controller. An override circuit includes inputs coupled to the input voltage of the power supply and an override threshold voltage. The override circuit includes an output coupled to the direct conduction avoidance circuit. An error amplifier includes inputs coupled to an output voltage of the power supply and a reference voltage. The error amplifier includes an output coupled to the power demand input of the controller.

In yet another example, a device includes a controller configured to control on and off timing of switch devices of a switching power supply to provide a regulated output voltage based on an input voltage to the power supply and a power demand signal. A direct conduction avoidance circuit is configured to monitor the regulated output voltage of the switching power supply with respect to a direct conduction threshold voltage and to provide a direct conduction avoidance signal to adjust the power demand signal to the controller based on the regulated output voltage exceeding the direct conduction threshold voltage. An override circuit is configured to disable the direct conduction avoidance circuit based on the input voltage of the switching power supply being below an override threshold voltage and to enable the direct conduction avoidance circuit based on the input voltage of the switching power supply being above the override threshold voltage. An error amplifier is configured to sense the regulated output voltage and a reference voltage. The error amplifier generates a compensation signal based on the regulated output voltage and the reference voltage. The compensation signal is combined with the direct conduction avoidance signal to the controller.

DETAILED DESCRIPTION

Figure 1:
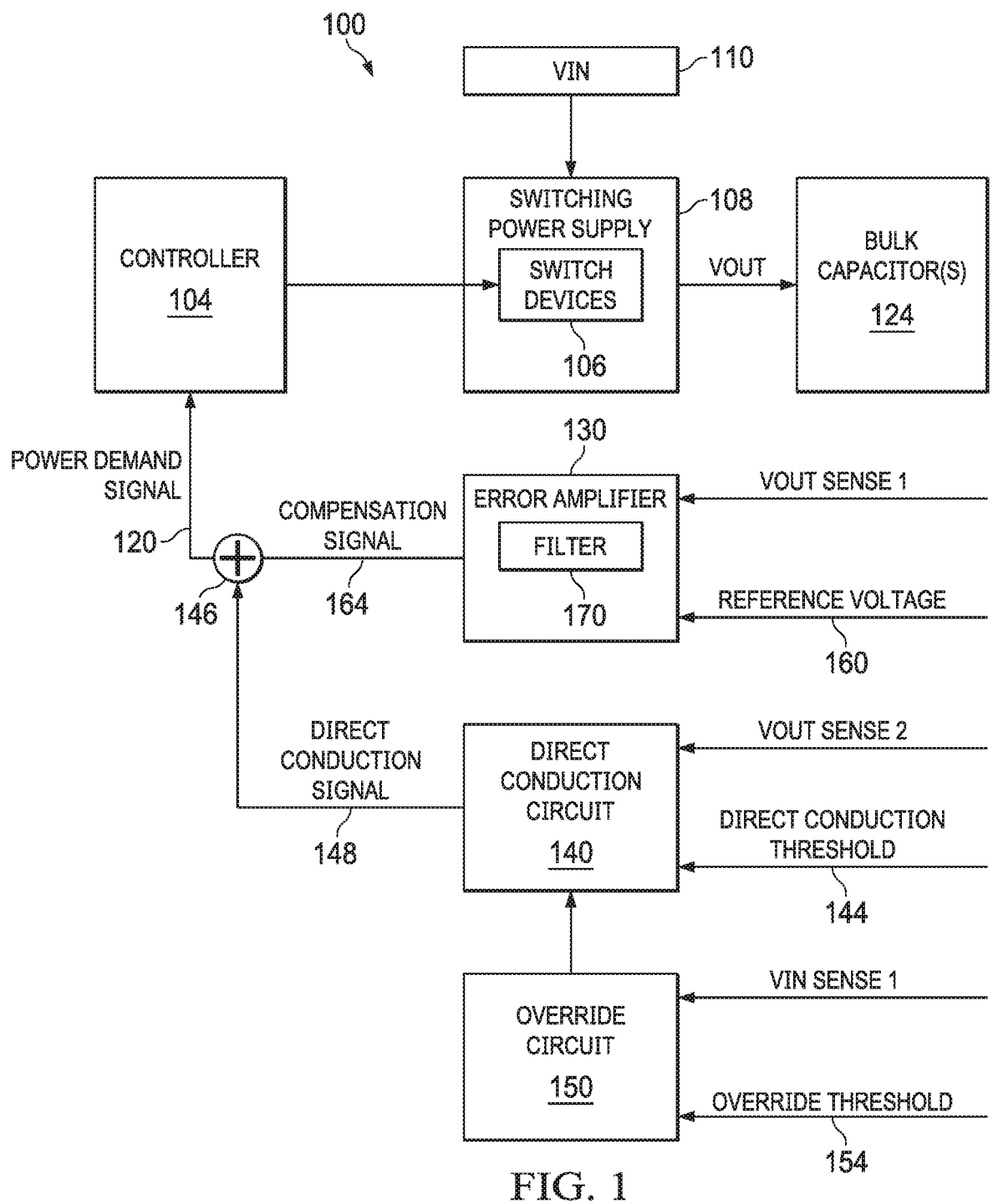
FIG. 1 illustrates an example block diagram of a power converter system with power factor correction circuitry.

This disclosure relates to a power factor correction (PFC) circuit and to a regulation circuit for a power converter system. The PFC circuit is configured to enable reduced output bulk capacitance to mitigate circuit costs and improve circuit reliability while regulating output voltage over a range of input voltage conditions. For example, the PFC circuit employs direct conduction control to reduce direct conduction at high input voltages. Such direct conduction control allows the use of a significantly reduced bulk capacitance at the output of the power converter. This reduction further enables use of a different (e.g., lower cost) type of bulk capacitor (e.g., film versus electrolytic) which can translate to an increased mean time between failure (MTBF) of the circuit. Reducing the output bulk capacitance also facilitates an overall system volume reduction for capacitor size, which also reduces circuit cost. However, as the output bulk capacitance is reduced, output ripple voltage tends to increase. Thus, if left unaddressed, the increased output ripple voltage can affect the stability of the PFC regulation circuit and also place the regulator into a direct conduction condition under high line input voltage conditions. Such direct conduction can cause audible noise and other distortions of the input line current. The PFC regulation circuits disclosed herein provides a direct conduction avoidance circuit to mitigate direct conduction conditions at high line conditions, load transients, and increased output ripple. The PFC regulation circuits also facilitate stable operations of the controller under increased output ripple due to reducing the output bulk storage capacitance.

In one example, a controller controls switch devices of a switching power supply to provide a regulated output voltage. For instance, a rectified alternating current (AC) input voltage can be switched by the switching devices (e.g., MOSFET switches) in a direct current (DC)-DC converter operation where power factor correction is applied at the input of the supply, such as by controlling switching times of switch devices to maintain output voltage and current phase relationship. The converter provides the regulated output voltage based on an input voltage to the power supply and a power demand signal that is provided to the controller to adjust switching times of the switch devices.

A direct conduction avoidance circuit monitors the regulated output voltage of the power supply with respect to a direct conduction threshold voltage and provides a direct conduction output signal. The direct conduction output signal is combined with a compensation signal to adjust the power demand signal supplied to the controller based on the output voltage exceeding the direct conduction threshold voltage. The direct conduction threshold voltage is set to detect high line voltage conditions where direct conduction could adversely affect system and/or circuit operations. Under nominal voltage conditions (e.g., less than high line voltage), however, an override circuit is configured to disable the direct conduction avoidance circuit when the input voltage of the power supply is below an override threshold voltage. In such lower input voltage conditions, the override circuit can disable direct conduction compensation and thereby mitigate potential disturbances from the direct conduction avoidance circuit due to increased ripple from the lowered output bulk capacitance.

As a further example, an error amplifier senses the regulated output voltage with respect to a reference threshold voltage. The error amplifier generates a compensation-signal based on the sensed output voltage relative to the reference threshold voltage (e.g., voltage output setpoint for the controller). The compensation signal is added to the direct conduction avoidance signal to provide the power demand signal to the controller. The controller is configured to adjust timing of the switch devices in the power supply based on the power demand signal. In order to further reduce the effects of increased ripple due to decreasing the output bulk storage capacitance, a filter can be provided to filter the compensation signal, where the filter mitigates ripple received from the sensed regulated output voltage due to reduced output bulk capacitance. In an example, the filter is a notch filter configured to mitigate ripple frequencies that are within a frequency range associated with the input AC voltage.

As used herein, the term "circuit" can include a collection of active and/or passive elements that perform a circuit function, such as an analog circuit or digital circuit. Additionally or alternatively, for example, the term "circuit" can include an IC where all or some of the circuit elements are fabricated on a common substrate (e.g., semiconductor substrate, such as a die or chip), such as disclosed herein. For example, the PFC circuit and/or other control circuitry may be implemented as a respective IC chip.

FIG. 1 illustrates an example of a power converter system 100 with power factor correction circuitry. A controller 104 is configured to control a plurality of switch devices 106 of a switching power supply 108 to provide a regulated output voltage VOUT. An input voltage VIN 110 is switched by the switch devices 106 (e.g., MOSFET switches) in a direct current (DC)-DC converter operation and where power factor correction is applied to the input of the supply at VIN 110. Power factor correction can be achieved by controlling switching times of switch devices 106 to thereby control the phase relationship between the input voltage VIN 110 and current supplied to power supply 108 from VIN. The controller 104 controls the switch devices 106 based on a power demand signal 120 to provide regulated output voltage VOUT based on VIN 110. Output bulk capacitors 124 are coupled to the output to filter VOUT. As disclosed herein, the power converter system 100 is configured to allow a reduction in size of the output bulk capacitors 124 which enables a reduction in overall system costs as well as increases circuit reliability since smaller film capacitors can be employed in place of less reliable electrolytic capacitors. With a reduction in the bulk capacitance, however, ripple voltage in VOUT may increase. As disclosed herein, an error amplifier 130 and a direct conduction avoidance circuit 140 are configured to compensate for the increased ripple voltage resulting from the reduced bulk capacitance.

As an example, the direct conduction avoidance circuit 140 monitors the regulated output voltage of the power supply, shown as VOUT SENSE 2, with respect to a direct conduction threshold voltage 144. The direct conduction avoidance circuit 140 provides a direct conduction avoidance signal to adjust the power demand signal 120 based on the output voltage exceeding the direct conduction threshold voltage. For example, the direct conduction avoidance circuit 140 applies the direct conduction avoidance signal 148 to a compensation signal 164 at a combining node 146 to provide the power demand signal 120. That is, the direct conduction avoidance signal 148 adjusts the compensation signal 164 to provide the power demand signal to the controller 104. The direct conduction threshold voltage 144 is set to detect VOUT voltage conditions where direct conduction may occur.

An override circuit 150 is coupled to disable the direct conduction avoidance circuit 140 based on the input voltage VIN. For example, under nominal voltage conditions (e.g., less than high line voltage conditions), the override circuit 150 disables the direct conduction avoidance circuit 140 based on detecting the input voltage of the power supply received at VIN SENSE 1 below an override threshold voltage 154. Thus, in the case of lower input voltage conditions, the override circuit 150 can disable the direct conduction avoidance circuit 140 to mitigate potential disturbances (e.g., audio noise caused by input line current distortion) from the direct conduction avoidance circuit 140 due to increased ripple from the lowered output bulk capacitance.

The error amplifier 130 can sense the regulated output voltage from VOUT SENSE 1 with respect to a reference voltage 160. The error amplifier 130 generates the compensation signal 164 based on the sensed output voltage relative to the reference voltage 160 (e.g., voltage output setpoint of controller). The combining node 146 combines the compensation signal 164 with the direct conduction avoidance signal 148 to provide the power demand signal 120, based on which the controller is to adjust on and off timing of the switch devices 106. In order to further reduce the effects of increased ripple due to decreasing the capacitance of output bulk capacitors 124, the error amplifier 130 can include a filter 170 to filter the compensation signal 164, which filtering mitigates voltage ripple in the sensed regulated output voltage VOUT SENSE 1. In an example, the filter 170 can be a filter network that is configured as a notch filter to attenuate frequencies in a predetermined frequency range associated with input line voltage VIN (e.g., from about 90 to about 300 Hz).

As mentioned, the controller 104 can be configured to adjust the switching time (on and off time) of the switch devices 106 to control the power factor of the input current supplied to switching power supply 108 with respect to the input voltage VIN 110. In one example, the controller 104 can be configured as a continuous on-time controller, but other types of controller and switching power supply configurations are possible. For example, the switching power supply 108 can be configured as at least one of a boost regulator, a buck regulator, or a buck-boost regulator coupled to receive VIN 110 (e.g., a rectified DC input voltage). Various components of the power converter system 100 can be implemented as an integrated circuit (IC) chip such as can include the controller 104, switch devices 106, error amplifier 130 and filter 170, direct conduction avoidance circuit 140, and/or override circuit 150.

By reducing the output bulk capacitors 124 size, system cost is improved since smaller capacitors can be used in place. Also, system reliability may be improved since more reliable capacitors (e.g., film capacitor) may be used in place of less reliable electrolytic capacitors. Reducing the capacitor size however, can cause higher ripple voltages to appear at VOUT and can also causes stability issues for the controller 104. Thus, rejecting the increased voltage ripple could imply reducing the control loop bandwidth to such an extent that the transient performance of the power converter system 100 would undesirably low. Advantageously, the power converter system 100 provides a technical solution for maintaining desired power factor by rejecting the line voltage ripple on the output bulk capacitors 124 from the error amplifier output at 164, while still maintaining desired transient response. This includes reducing direct conduction through power supply transformers (see, e.g., FIG. 5) during high line conditions with a reduced bulk capacitance.

By way of example, direct conduction can occur when the power converter system 100 enters an operating mode where the load is pulsed on and off with load current peaks of two times (2×) to 3× the nominal load current at a duty cycle which maintains power out (Pout)<power maximum (Pmax). This condition may occur when the power converter system 100 operates in a mode where the switching power supply 108 senses repeated light load to heavy load transients. For example, when this load transient is coincident with the line voltage crossing through zero, significant charge is being drawn out of the output bulk capacitors 124, but very little charge is being supplied from the input and thus, the bus voltage VOUT then drops. The error amplifier 130 and filter 170, along with the direct conduction avoidance circuit 140 and override circuit 150, as described herein, are configured to compensate for these issues (e.g., the effects of load transients, reduced output bulk capacitance, direct conduction operation, and controller instability).

Figure 2:
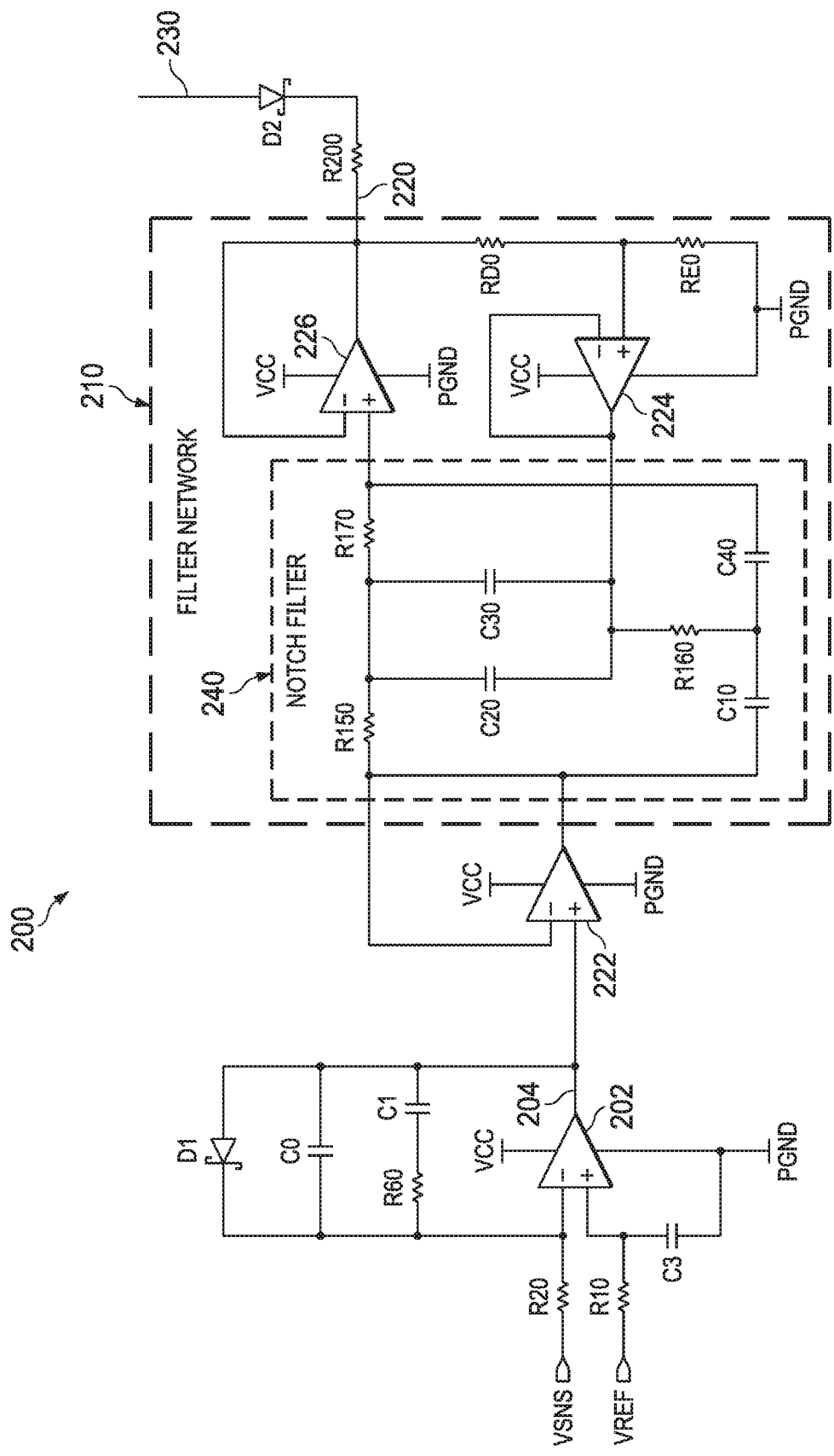
FIG. 2 illustrates an example circuit diagram of an error amplifier and filter for a power factor correction circuit.

FIG. 2 illustrates an example circuit 200 of an error amplifier 202 and filter network 210 for a power factor correction circuit. In this example, the error amplifier 202 corresponds to error amplifier 130 of FIG. 1 and the filter network 210 corresponds to the filter 170. The error amplifier 202 is configured to receive the regulated output voltage shown as VSNS (referred to as VOUT SENSE 1 in FIG. 1) and a reference voltage VREF. The error amplifier 202 is configured to generate a compensation signal at output terminal 204 of the error amplifier (e.g., error amp output) based on the output voltage VSNS and the reference voltage VREF. A filter network 210 is configured to filter the compensation signal from output terminal 204 of the error amplifier 202 to provide a filtered compensation signal 220 (e.g., filtered output) to reduce ripple in the compensation signal. The filtered compensation signal at 220 is combined through diode D2 and resistor R200 with the direct conduction avoidance signal (see FIG. 3) to provide the power demand signal 230 to a controller (e.g., controller 104 of FIG. 1). The filter network 210 includes a notch filter 240 configured to attenuate frequencies in a predetermined frequency range. Although the filter network 210 and/or notch filter 240 is shown after the error amplifier 202 to provide desired filtering in this example, in other examples, the filter network and/or notch filter can be placed before the error amplifier to filter the input signal VSNS.

An output of the error amplifier 202 can be buffered by amplifier 222 (in some examples) to provide a buffered compensation signal to the filter network 210. An input buffer circuit 224 is coupled to the filtered compensation signal 220 to provide a buffered feedback signal to the filter network 240. An output buffer circuit 226 is coupled to an output of the filter network 210 to adjust the filtered compensation signal 220. Resistors RE0 and RD0 provide coupling between the input buffer circuit 224 and output buffer circuit 226. An input resistor R20 is coupled to the inverting input of the error amplifier to receive VSNS. Another input resistor R10 is coupled to the non-inverting input of the error amplifier to receive VREF.

A capacitor C3 is coupled between the non-inverting input of error amplifier and the power ground PGND. The error amplifier 202 may include feedback capacitor C0 and C1, where C1 is in series with R60 to provide filtering at a desired corner frequency. A feedback diode D1 can also be coupled between the output and the input of the error amplifier in parallel with the other feedback circuitry. As mentioned, the compensation signal at 204 from error amplifier 202 can be buffered by amplifier 222 which drives the notch filter 240. The notch filter 240 can include capacitors C20 and C30 connected in parallel at one node and which are coupled through resistor R160 to series capacitors C10 and C40. Series resistors R150 and R170 can be coupled to the other node of C20 and C30.

Figure 8:
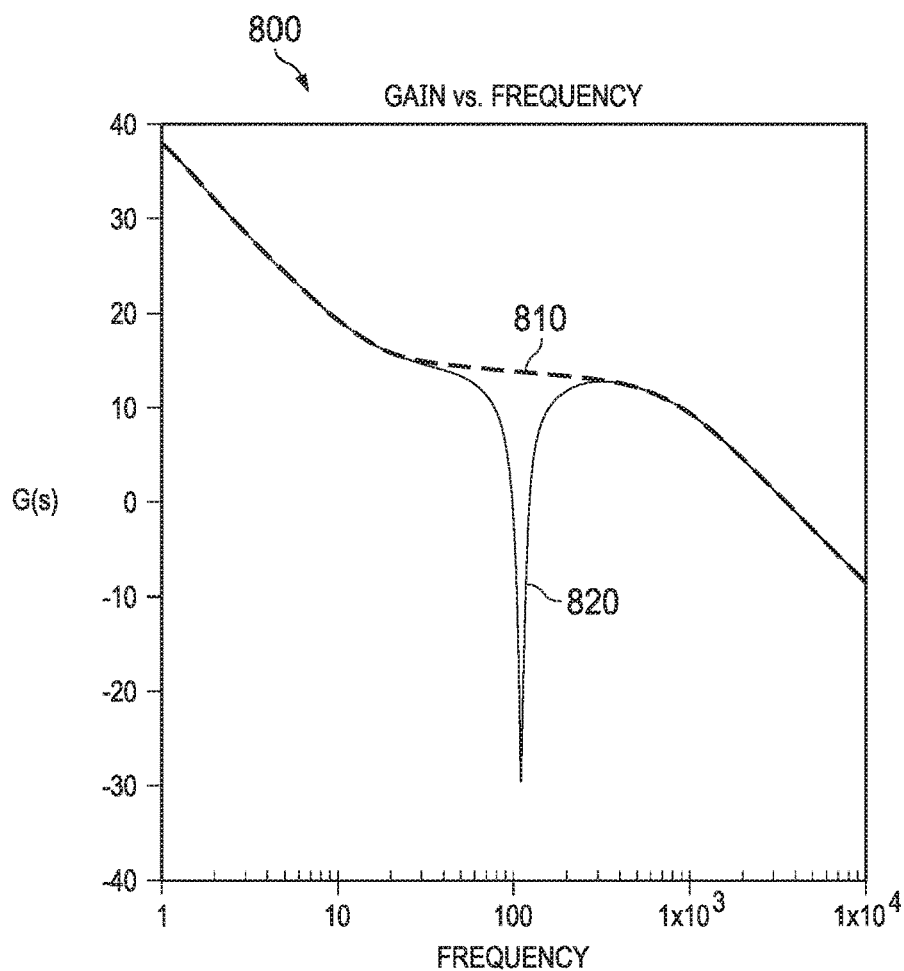
FIG. 8 is a plot illustrating gain versus frequency response from an error amplifier and filter for a power factor correction circuit.

The response of the notch filter 240 allows the gain of the error amplifier 202 to be maintained or increased below twice (or more) the line frequency for maintaining desired transient response while rejecting the large amount of bus voltage ripple at this frequency. An example plot of this performance is illustrated in FIG. 8 that shows the response of the error amplifier 202 at 810 and the combined response of the error amplifier and notch filter at 820.

Figure 9:
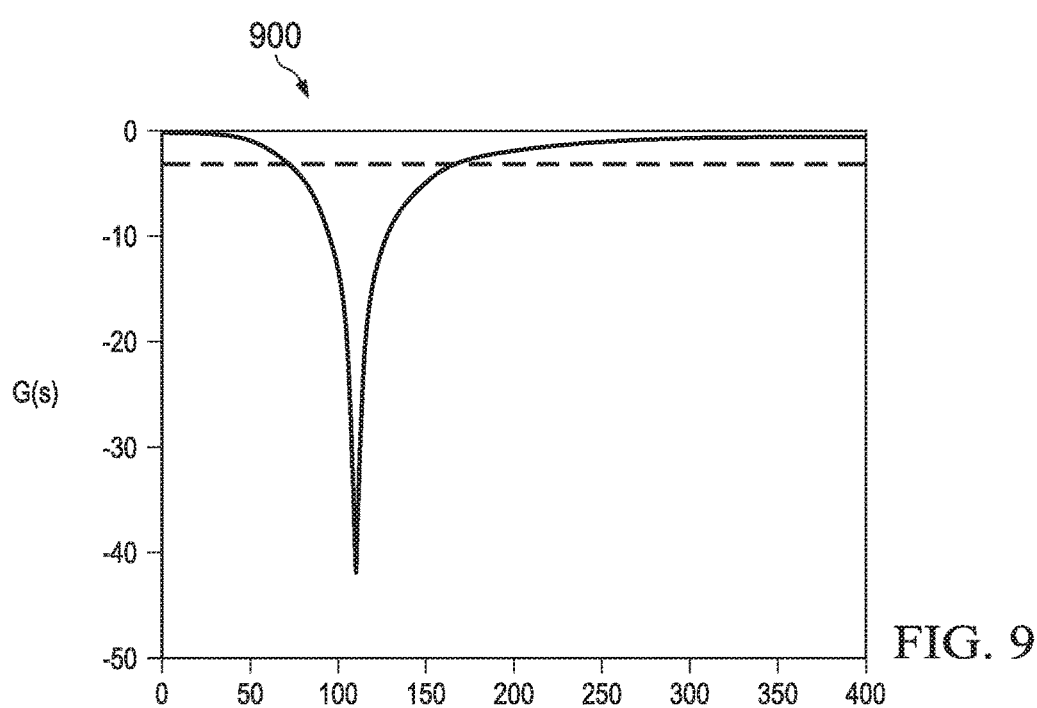
FIG. 9 is a plot illustrating gain characteristics of an example notch filter for a power factor correction circuit.

The error amplifier 202 acts as an inverting error amplifier outputting the difference between the sensed bulk voltage VSNS and the reference VREF multiplied by the gain provided by the network of C0, C1, R60 and R20. In an example, the amplifier 222 includes a unity gain buffer that is configured to reduce the response of the notch filter 240 formed by components R150-R170 and C10-C40 from being corrupted by preceding circuitry. In other examples, this amplifier 222 can be omitted without appreciably affecting the performance of the circuit 200. Resistors R150-R170, RE0, RD0, along with capacitors C10-C40, input buffer circuit 222 and output buffer circuit 226 can be configured, as shown, for implementing the filter network 210, the gain characteristics of which is shown in FIG. 9. The filter network 210 passes low frequencies and high frequencies, but the filter attenuates frequencies around the specified notch point (e.g., approximately 110 Hz).

The AC line frequency is 50 Hz or 60 Hz depending on locations in the world the system is implemented. Thus, the full wave rectified line voltage and the ripple voltage on the bulk capacitor has a frequency of between 100 Hz and 120 Hz. The notch center frequency of 110 Hz thus can be chosen as the reject frequency to provide desired attenuation at both ends of the range of expected ripple voltage. The output of the notch filter 240 is connected to the compensation input of the controller through diode D2, which can be implemented as the on-time control block of the controller. In an example, the power demand signal 230 is tied to a current source internally in the IC (see FIG. 4) and the control action is affected by pulling down on the voltage developed on C15, such as shown in FIG. 4, below through diode D2. The power demand signal 230 in FIG. 2 is coupled to the power demand signal 330 in FIG. 3.

Figure 3:
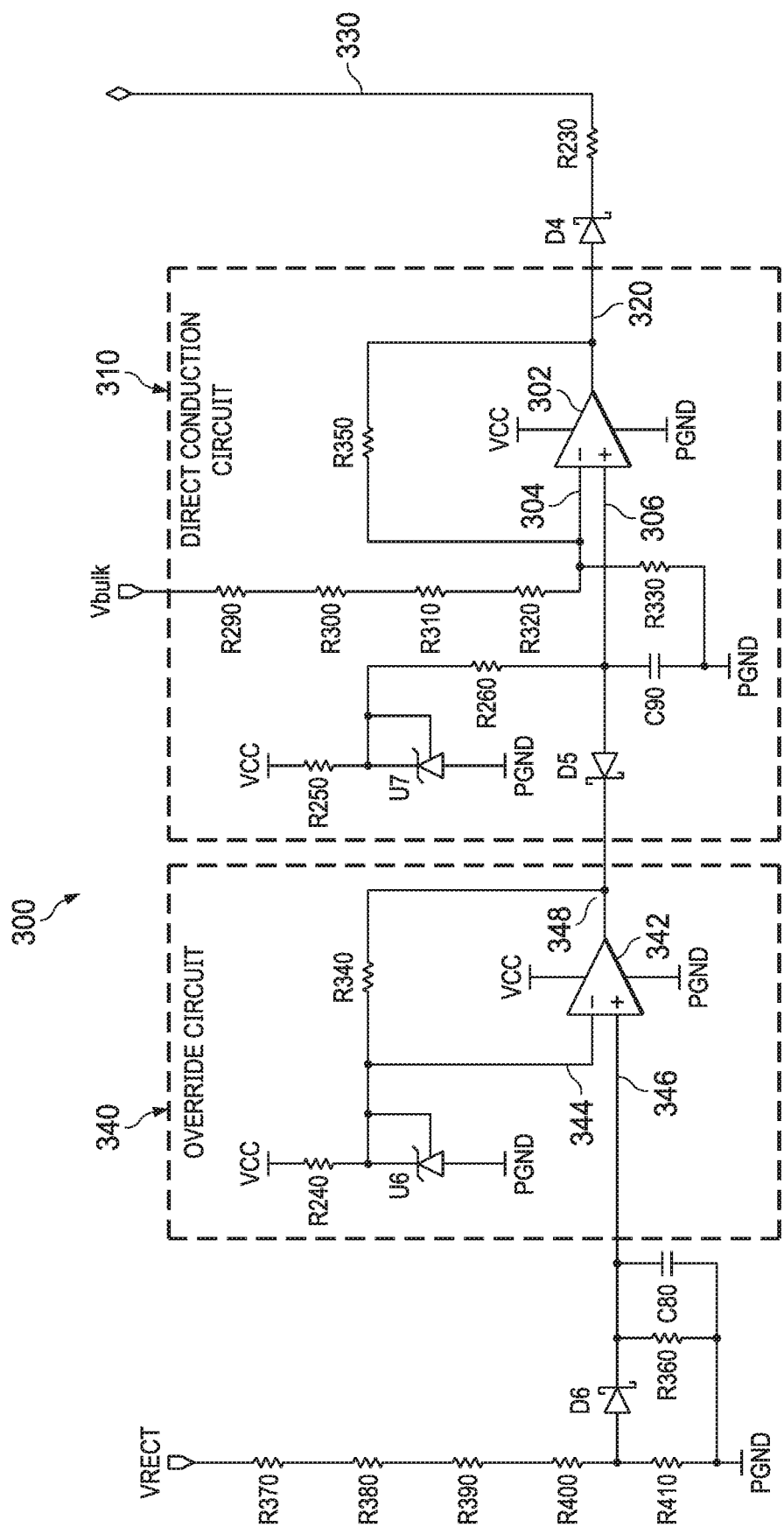
FIG. 3 illustrates an example circuit diagram of a direct conduction avoidance circuit and an override circuit for a power factor correction circuit.
Figure 4:
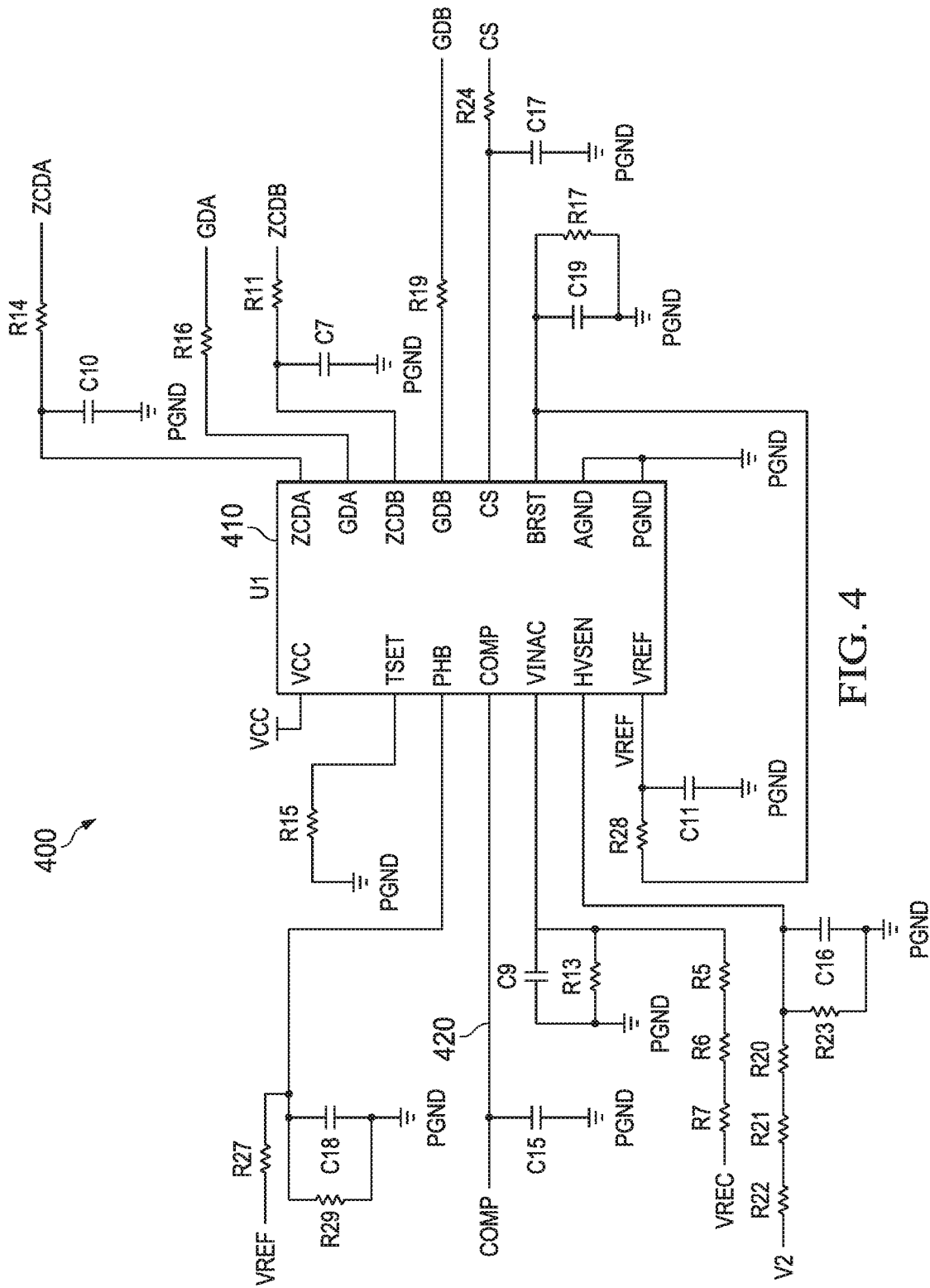
FIG. 4 illustrates an example circuit diagram of an integrated circuit for a power factor correction circuit.

FIG. 3 illustrates an example circuit 300 of a direct conduction avoidance circuit and an override circuit for a power factor correction circuit. A direct conduction avoidance circuit 310 includes a direct conduction comparator 302 having a first input terminal 304 configured to sense the regulated output voltage VBULK through resistors R290, R300, R310, and R320 which are connected to first input terminal and through R330 to ground labeled PGND. A second input terminal 306 of the direct conduction comparator 302 receives the direct conduction threshold voltage which is supplied by VCC through R250 and Zener shunt regulator U7 connected to second input terminal 306 through R260 which is also coupled to PGND through C90. The direct conduction comparator 302 is configured to provide a direct conduction avoidance signal 320 based on the first input and the second input. The direct conduction avoidance signal 320 adjusts the power demand signal at 330 through diode D4 and R230 to mitigate direct conduction from the input voltage to the regulated output voltage. The power demand signal 330 is coupled to the power demand signal 230 of FIG. 2 which in turn is provided to a controller IC, such as depicted in FIG. 4.

An override circuit 340 includes an override comparator 342 configured to compare an override threshold voltage supplied to terminal 344 to the input voltage at terminal 346. The input voltage at 346 is supplied from VRECT which represents the rectified DC version of the input voltage (e.g., VIN of FIG. 1). The override comparator has an output terminal 348 coupled to the second input terminal 306 of the direct conduction comparator 302. In one example, the override comparator 342 is configured to disable the direct conduction avoidance circuit 310 by adjusting the direct conduction threshold voltage at the second input terminal 306 when the input voltage supplied by VRECT is below the override threshold voltage.

Thus, when the override comparator 342 turns on, conduction is established through diode D5 which lowers the value of the threshold (takes it toward ground) provided to the second input terminal 306 of the direct conduction comparator 302 which in effect disables further control signaling from the direct conduction comparator 302. The override threshold voltage is supplied from VCC through R250 and Zener shunt regulator U6. Feedback resistor R340 can supply feedback from the output terminal 348 of the override comparator 342 to its input pin 13. The input voltage can be sensed at terminal 346 of the override comparator 342 through diode D6 from resistor network R370, 380, 390, 400, and 410. Resistor R360 and capacitor C80 can be provided for filtering the rectified input voltage.

To mitigate direct conduction and stability issues, the circuit 300 is configured to drive the power demand signal 330 high under conditions which could give rise to direct conduction from the input voltage VIN to the load at VOUT, and thus it may deliver more power to the load quickly to mitigate direct conduction from occurring. To avoid signal corruption, the direct conduction comparator 302 operates to drive the power demand signal 330 high through D4 and R230 when the divided down instantaneous output voltage falls below a reference level. The resistor R200 from FIG. 2 is inserted to allow the output of direct conduction comparator 302 to temporarily affect the power demand signal 330 even if output buffer circuit 226 of FIG. 2 is pulling down.

Depending on the design of the power stage, the amount of bulk capacitor used and the load current step, the threshold at the first input terminal 304 of the direct conduction comparator 302 may need to be higher than the voltage where direct conduction would occur, in order to increase the amount of charge flowing into the bulk capacitor sufficiently in advance to avoid direct conduction. As one example, this threshold can be set to 430V in this example based on an average bulk voltage setpoint of 430V. As can be observed in FIG. 11, due to the delay caused by the parasitic capacitance at the second input terminal 306 and resistors R290-R320, the output of 302 goes high when signal 1130 reaches 400V (as shown by the dashed line of FIG. 11) with these values.

FIG. 4 illustrates an example circuit 400 of an integrated circuit (IC) for a power factor correction circuit. Power VCC (from external power supply not shown) is provided to a controller IC 410. Power from VCC is also used for threshold voltages for the direct conduction and override circuits of FIG. 3. It is noted that the error amplifier, filter, direct conduction avoidance circuits have been shown external to the controller IC 410 but in other implementations, these circuits could be implemented internally to the controller IC 410. In this example, an internal error amplifier of the controller IC 410 is disabled and a compensation signal COMP 420 is driven externally by the combined power demand signals previously described with respect to FIGS. 2 and 3. The controller IC 410 monitors current via ZCDA and ZCDB inputs which are respectively filtered by R14 and C10 for ZCDA and R11 and C7 for ZCDB. These and other signals which drive the IC 410 and or driven from the IC are illustrated and described below with respect to FIG. 5.

AGND and PGND of IC 410 are coupled to PGND, and a CS input is provided for programming the IC. The signals GDA and GDB drive the switching devices described herein. GDA is supplied through R16 whereas GDB of the IC 510 is supplied through R19. A TSET input is coupled to PGND through R15. A PHB input at is coupled to VREF through R27 and filtered by capacitor C18 and R29. A VINAC input monitors VREC (output of bridge diode of FIG. 5) through resistors R5, R6, and R7 where capacitor C9 and R13 provide filtering. A high voltage sense HVSEN input is coupled to monitor node V2 of FIG. 5 (bulk output voltage) through resistors R20, R21, and R22 that is filtered by R23 and C16. A reference output VREF which is coupled to reset input BRST.

Figure 5:
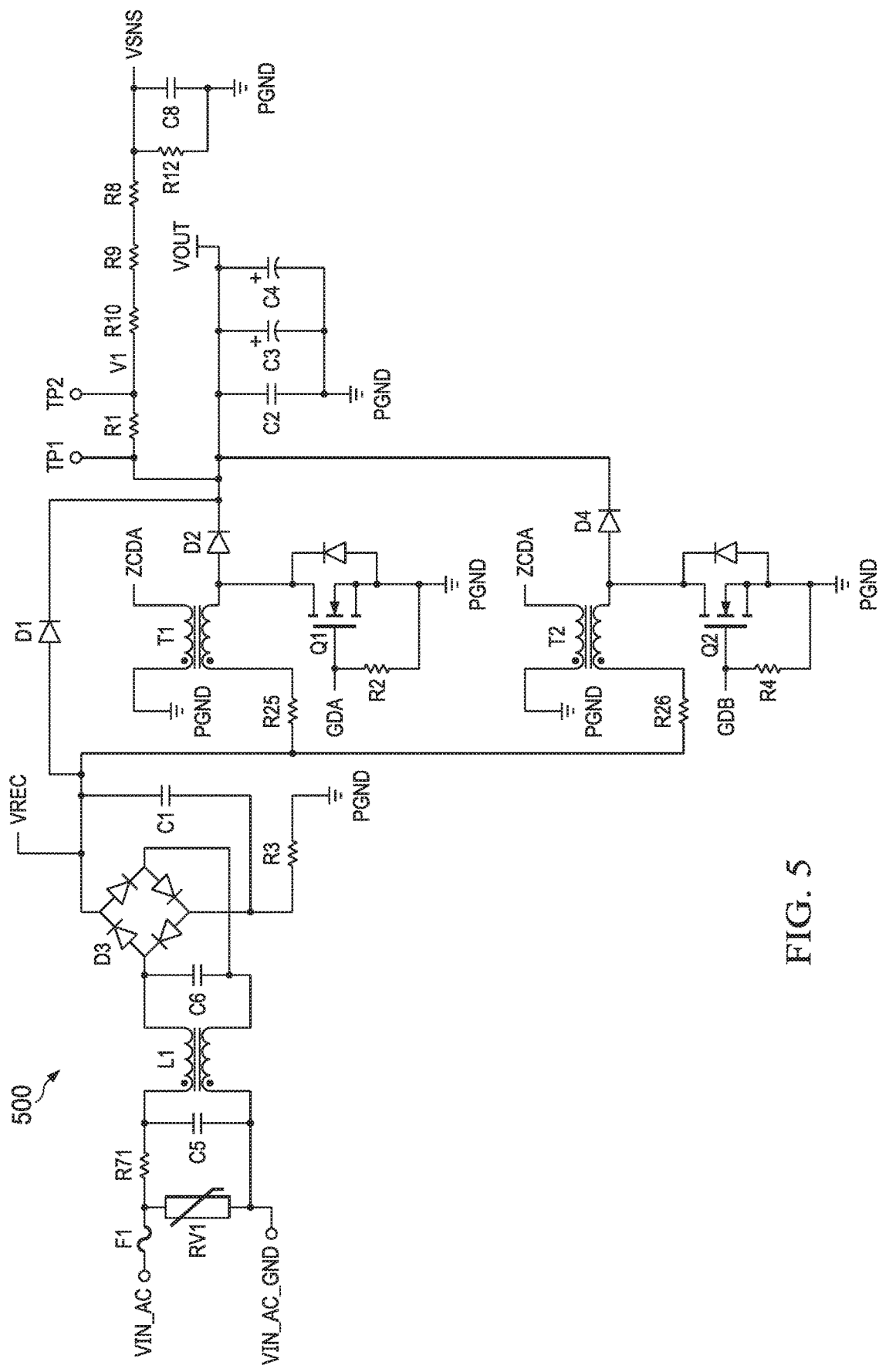
FIG. 5 illustrates an example circuit diagram of a switching power supply for a power factor correction circuit.

FIG. 5 illustrates an example circuit 500 of a switching power supply for a power factor correction circuit (e.g., corresponding to switching power supply 108 of FIG. 1). The circuit 500 receives AC input (e.g., 120V, 60 HZ) shown as VIN_AC, through fuse F1 where a varistor RV1 also provides input protection and is coupled to a return path for VIN_AC and labeled VIN_AC_GND. R71 and C5 provide filter of the AC input through bridge diode D3 which is connected on one end to resistor R3 to ground PGND and at the other end provides rectified DC voltage shown as VREC. Capacitor C1 provides output filtering for D3.

The DC voltage VREC is supplied through transformer T1 which is switched by switching device Q1 in response to GDA signal (e.g., provided by the controller IC 410 of FIG. 4). The DC voltage VREC is also supplied through transformer T2 which is switched by switching device Q2 in response to GDB signal provided by the controller IC 410. ZCDA and ZCDA are fed from transformers T1 and T2 respectively to provide current feedback to the controller IC 410 of FIG. 4. Outputs from T1 and T2 are fed through diodes D2 and D4 respectively to supply the corresponding output voltage VOUT across bulk capacitors C2, C3, and C4. Diode D1 is provided to supply inrush current on startup of the power supply. A divider and filter network that includes R1, R10, R9, R12, and C8 divide the output voltage VOUT to provide the sensed bulk voltage VSNS that is fed to the error amplifier 202 of FIG. 2.

Figure 6:
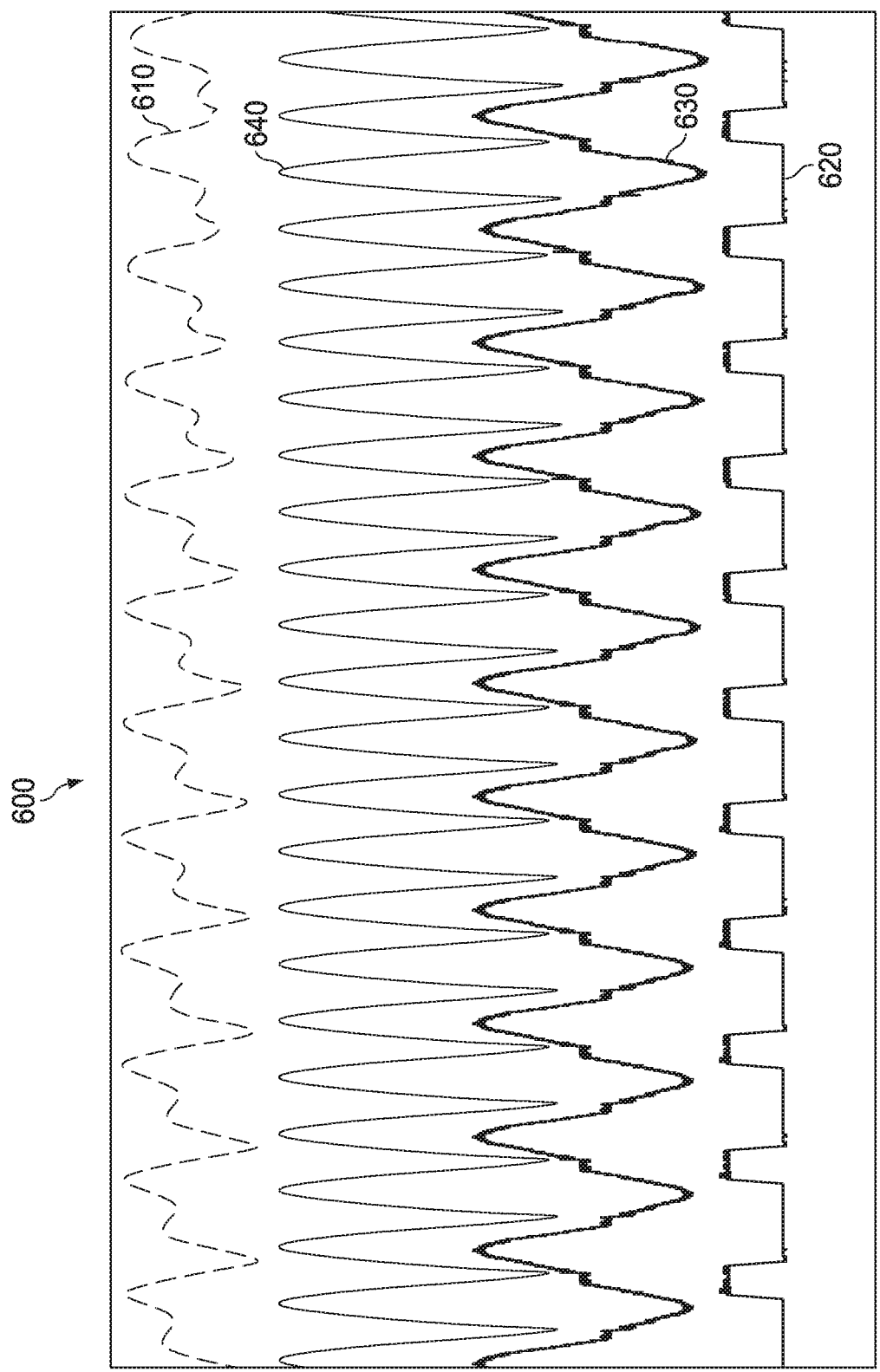
FIG. 6 is an example signal diagram illustrating non-direct conduction conditions for a power factor correction circuit.

FIG. 6 illustrates an example signal diagram 600 representing non-direct conduction conditions for signals in a power factor correction circuit. When a load transient is coincident with the line voltage crossing through zero, a significant charge is being drawn out of the bulk capacitor, but very little charge is being supplied from the input and thus, the bus voltage then drops significantly. The signal diagram 600 shows normal signal operations that do not cause direct conduction conditions. At 610, bulk capacitor voltage is represented. At 620, load current transients (out of the downstream DC-DC converter) is represented. The load current from the power factor correction stage (not shown) will have a similar characteristic. At 630, line input current is represented. At 640, line input voltage is represented.

Figure 7:
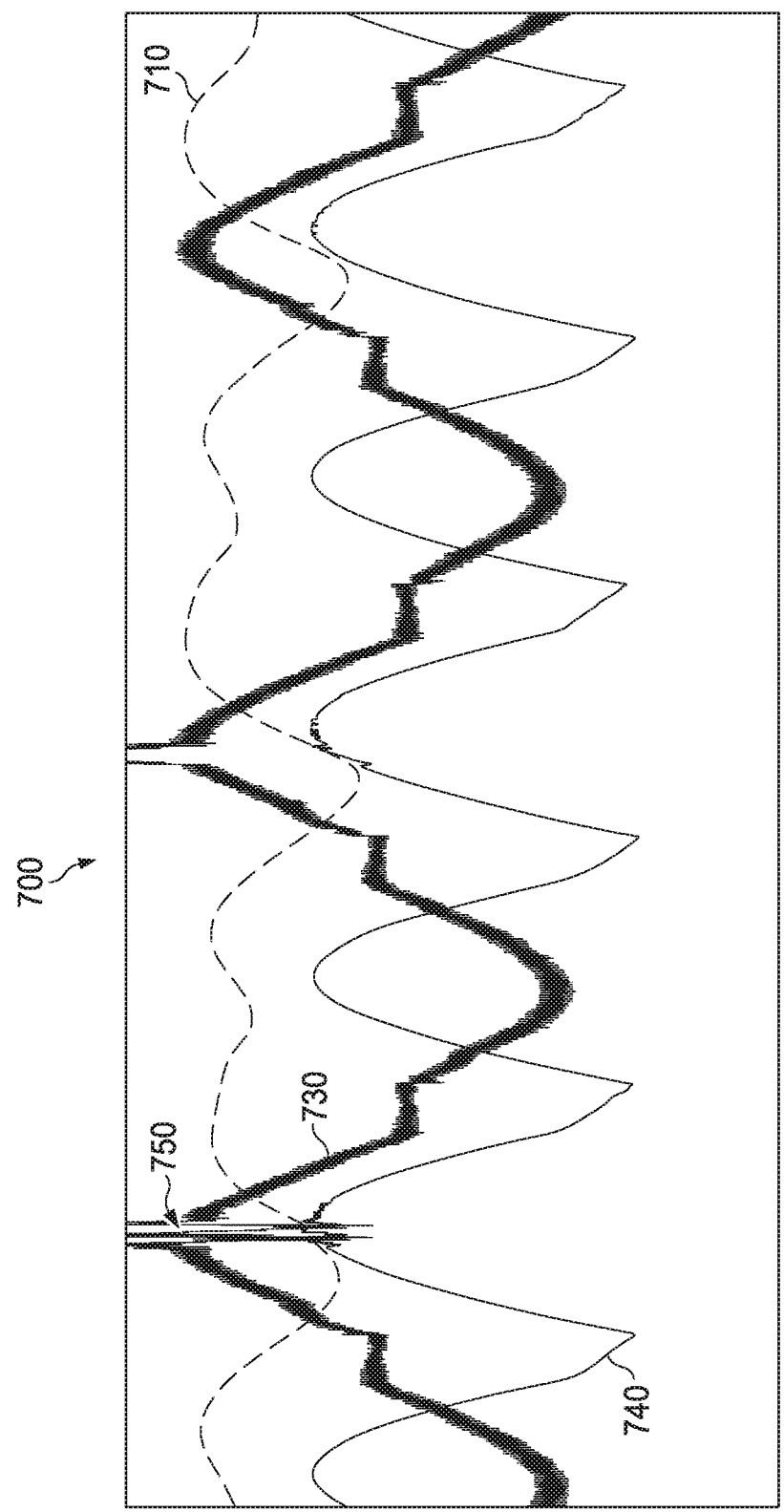
FIG. 7 is an example signal diagram illustrating direct conduction condition for a power factor correction circuit.

FIG. 7 illustrates an example signal diagram 700 representing direct conduction conditions for a power factor correction circuit. At 740, the line input voltage is represented. At 710, the bulk capacitor voltage is represented. At 730, the line input current is represented. At 750, the bulk voltage 710 is less than the peak of the line voltage 730 and this is where direct conduction occurs. As shown at 750, noise spikes are generated in the line input current.

FIG. 8 illustrates an example diagram 800 representing a gain versus frequency response from an error amplifier and filter for a power factor correction circuit. Gain is shown on the vertical axis in decibels (dB) whereas frequency is shown on the horizontal axis in Hertz. The diagram 800 shows the response of the error amplifier 202 of FIG. 2 at 810 and the combined response of the error amplifier and notch filter (e.g., filtered error signal at 220 of FIG. 2) at 820.

FIG. 9 illustrates an example diagram 900 of a gain characteristic of an example notch filter for a power factor correction circuit (e.g., centered about 110 Hz). The gain characteristic of the diagram 900 relates to the filter network depicted in FIG. 2. Gain is represented in decibels (dB) on the vertical axis and frequency in Hertz is represented on the horizontal axis.

Figure 10:
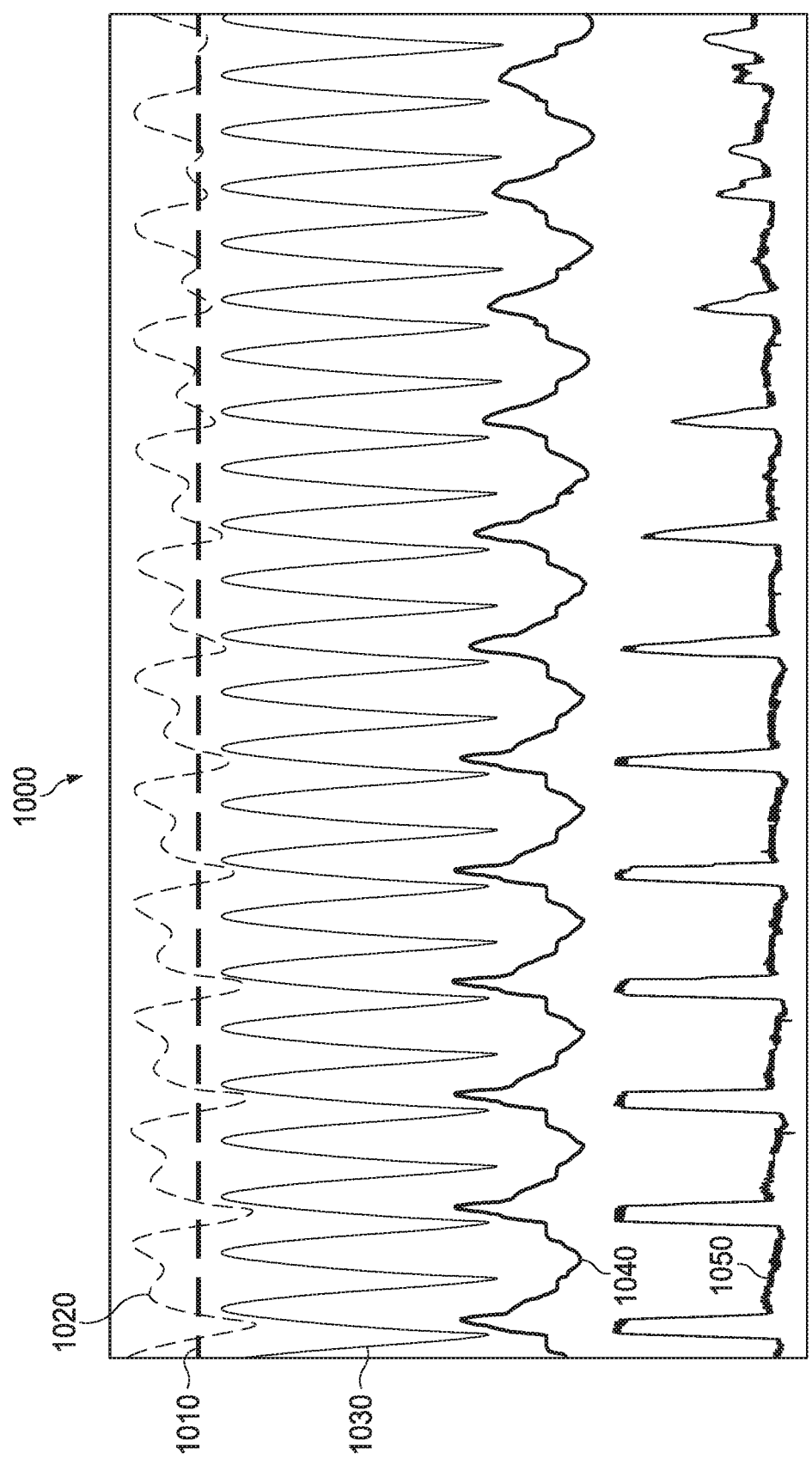
FIG. 10 is an example signal diagram illustrating ripple voltages affecting direct conduction avoidance circuit operations of a power factor correction circuit.

FIG. 10 illustrates an example signal diagram 1000 showing ripple voltages that can affect direct conduction avoidance circuit operations of a power factor correction circuit. At 1010, a direct conduction threshold is shown with a bulk capacitor voltage 1020 overlaying the threshold. At 1030, the line input voltage is represented and the line input current is represented at 1040. At 1050, a direct conduction avoidance signal as described herein is generated each time the bulk capacitor voltage 1020 dips below the line input voltage 1030.

Figure 11:
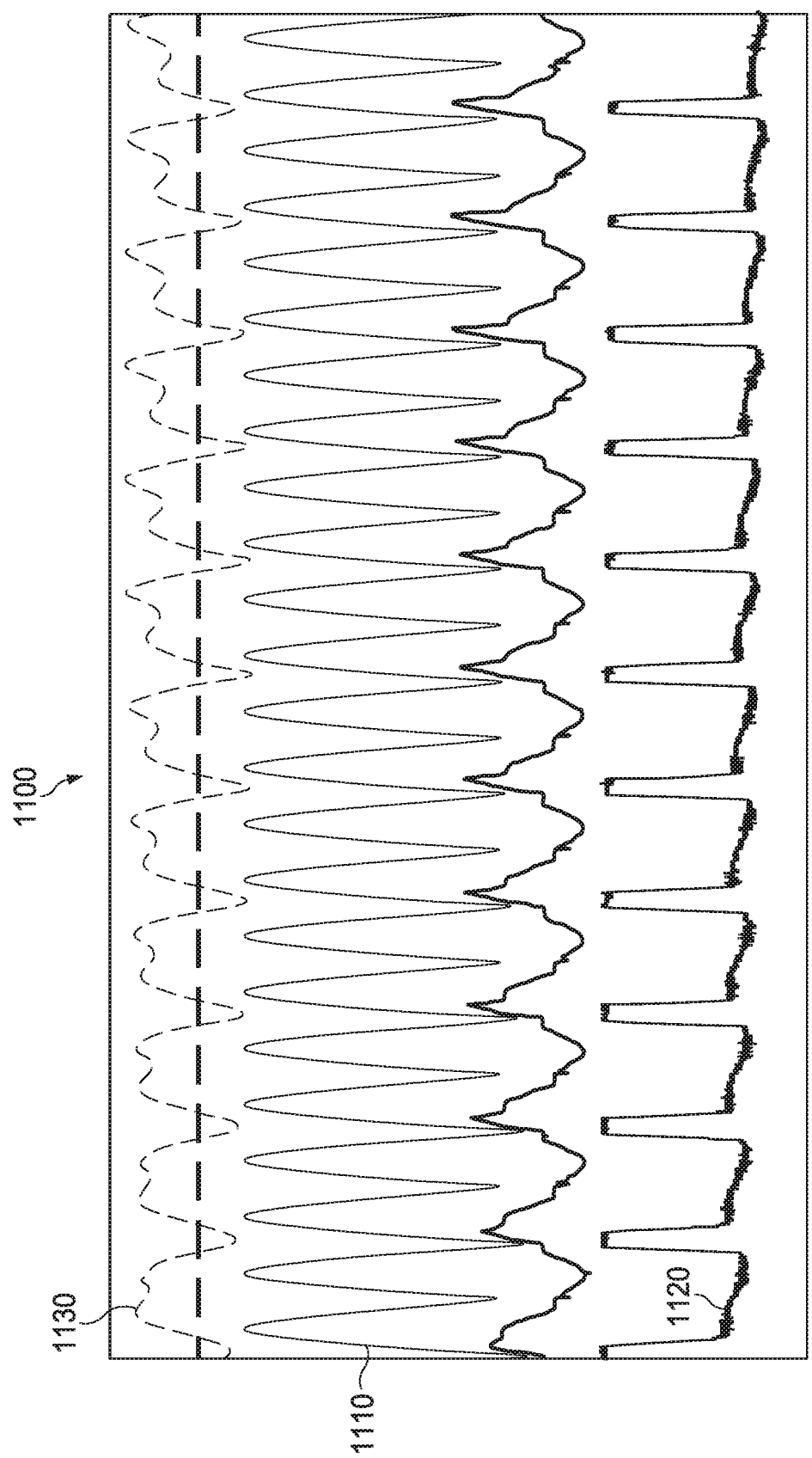
FIG. 11 illustrates a high input line condition where direct conduction can occur in a power factor correction circuit and where a direct conduction avoidance circuit is enabled.

FIG. 11 illustrates a high input line condition where direct conduction can occur in a power factor correction circuit and where a direct conduction avoidance circuit (e.g., direct conduction avoidance circuit 140) is enabled. In this example, the input line voltage at 1110 is at about 245 V which causes a direct conduction avoidance signal 1120 to be generated each time bulk capacitor voltage shown at signal 1130 dips below the dashed threshold. Thus, when high line input conditions are present, direct conduction can occur and the direct conduction avoidance circuit 140 and 310 are not disabled by the override circuit 150 of FIG. 1 and 340 of FIG. 3, respectively.

Figure 12:
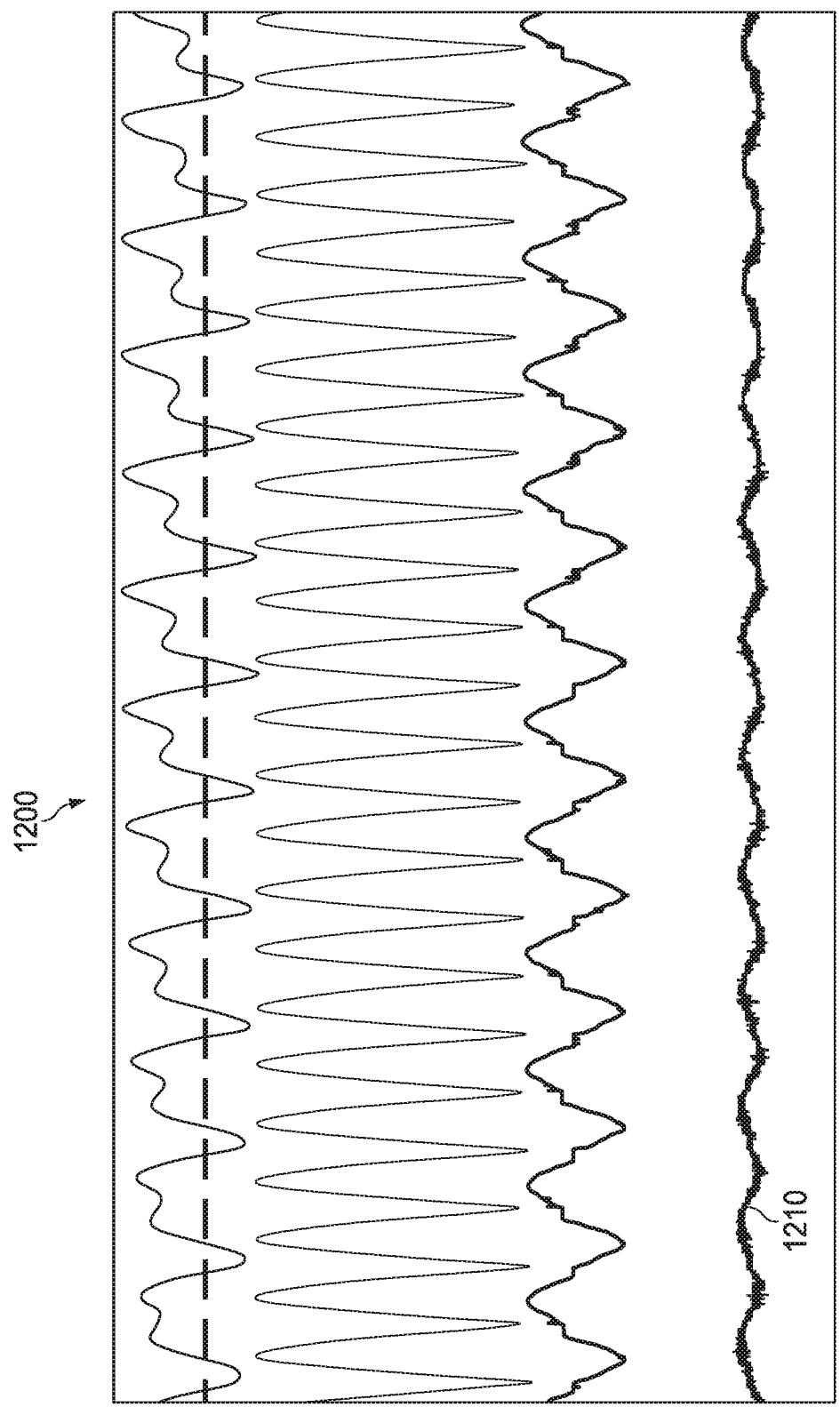
FIG. 12 illustrates a nominal input line condition where direct conduction does not occur in a power factor correction circuit and where a direct conduction avoidance circuit is disabled.

FIG. 12 illustrates a nominal input line condition (e.g., about 240 volts) where direct conduction does not occur in a power factor correction circuit and where a direct conduction avoidance circuit is disabled. As shown at 1210, a direct conduction avoidance signal is no longer active, as was illustrated in FIG. 11. In FIG. 2, the input line conditions have been reduced to where direct conduction is no longer present. Under these conditions, the override circuit 150 and 340 described herein detect that the direct conduction condition is no longer present and thus, disables the direct conduction avoidance circuits described herein from generating the direct conduction avoidance signal at 1210.

What have been described above are examples. It is, of course, not possible to describe every conceivable combination of components or methods, but one of ordinary skill in the art will recognize that many further combinations and permutations are possible. Accordingly, the disclosure is intended to embrace all such alterations, modifications, and variations that fall within the scope of this application, including the appended claims. As used herein, the term "includes" means includes but not limited to, the term "including" means including but not limited to. Additionally, where the disclosure or claims recite "a," "an," "a first," or "another" element, or the equivalent thereof, it should be interpreted to include one or more than one such element, neither requiring nor excluding two or more such elements.

What is claimed is:

1. A system, comprising:
   a switching power supply that includes switch devices configured to provide a regulated output voltage based on an input voltage;
   a controller coupled to the switching power supply and configured to control the switch devices based on a power demand signal;
   an error amplifier configured to receive the regulated output voltage and a reference voltage and generate a compensation signal based on the regulated output voltage and the reference voltage;
   a direct conduction avoidance circuit configured to provide a direct conduction avoidance signal based on the regulated output voltage exceeding a direct conduction threshold voltage;
   a summing junction in which the direct conduction avoidance signal is combined with the compensation signal to generate the power demand signal; and
   an override circuit configured to disable the direct conduction avoidance circuit based on the input voltage of the switching power supply being below an override threshold voltage.

2. The system of claim 1, in which the direct conduction avoidance circuit includes a direct conduction comparator having a first input configured to sense the regulated output voltage and a second input configured to receive the direct conduction threshold voltage, the direct conduction comparator configured to provide the direct conduction avoidance signal based on the first input and the second input, the direct conduction avoidance signal configured to adjust the power demand signal to mitigate direct conduction from the input voltage to the regulated output voltage.

3. The system of claim 2, in which the override circuit includes an override comparator configured to compare the override threshold voltage to the input voltage, an output of the override comparator being coupled to the second input of the direct conduction comparator.

4. The system of claim 3, in which the override comparator is configured to disable the direct conduction avoidance circuit by adjusting the direct conduction threshold voltage at the second input of the direct conduction comparator when the input voltage is below the override threshold voltage.

5. The system of claim 1, including a filter network configured to filter the compensation signal to provide a filtered compensation signal to reduce ripple in the compensation signal.

6. The system of claim 5, in which the filter network includes a notch filter configured to attenuate frequencies in a predetermined frequency range.

7. The system of claim 5, the filter network further including:
   an input buffer circuit coupled to the filtered compensation signal to provide a buffered feedback signal to the filter network, and
   an output buffer circuit coupled to a filter output of the filter network to adjust the filtered compensation signal.

8. The system of claim 1, in which the controller is configured to adjust a switching time of the switch devices to control a power factor of the input current with respect to the input line voltage.

9. The system of claim 1, in which the switching power supply is configured as at least one of a boost regulator, a buck regulator, or a buck-boost regulator coupled to receive the input voltage as a rectified DC input voltage.

10. An integrated circuit (IC) chip comprising the system of claim 1.

11. A circuit, comprising:
    a controller including outputs coupled to switching devices of a power supply including an input voltage input coupled to an input voltage, the controller including a power demand input;
    a direct conduction avoidance circuit including inputs coupled to the power supply and a direct conduction threshold voltage, the direct conduction avoidance circuit including a direct conduction output coupled to the power demand input;
    an override circuit including first and second inputs coupled to the input voltage of the power supply and an override threshold voltage respectively, the override circuit including an output coupled to the direct conduction avoidance circuit; and
    an error amplifier including first and second inputs coupled to an output voltage of the power supply and a reference voltage respectively, the error amplifier including an output coupled to the compensation input of the controller.

12. The circuit of claim 11, including a filter network configured to filter a compensation signal from the output of the error amplifier to provide a filtered compensation signal to reduce ripple in the compensation signal.

13. The circuit of claim 12, in which the filter network includes a notch filter configured to attenuate frequencies in a predetermined frequency range.

14. The circuit of claim 13, the filter network including an input buffer circuit and an output buffer circuit, the input buffer circuit coupled to the filtered compensation signal to provide a buffered feedback signal to the filter network, and the output buffer circuit coupled to an output of the filter network to provide the filtered compensation signal.

15. The circuit of claim 11, in which the direct conduction avoidance circuit includes a direct conduction comparator having a first input to sense the output voltage of the power supply and a second input configured to receive the direct conduction threshold voltage, the direct conduction comparator configured to provide a direct conduction avoidance signal at the direct conduction output based on the first input and the second input, the direct conduction avoidance signal being applied to adjust a power demand signal that is supplied to the power demand input to compensate for direct conduction from the input voltage to the output voltage of the power supply.

16. The circuit of claim 15, in which the override circuit includes an override comparator configured to compare the override threshold voltage to the input voltage, an output of the override comparator being coupled to the second input of the direct conduction comparator.

17. The circuit of claim 16, in which the override comparator is configured to disable the direct conduction avoidance circuit by adjusting the direct conduction threshold voltage at the second input of the direct conduction comparator when the input voltage is below the override threshold voltage.

18. A device, comprising:
- a controller configured to control on and off timing of switch devices of a switching power supply to provide a regulated output voltage based on an input voltage to the switching power supply and a power demand signal;
- a direct conduction avoidance circuit configured to monitor the regulated output voltage of the switching power supply with respect to a direct conduction threshold voltage and to provide a direct conduction avoidance signal to adjust the power demand signal to the controller based on the regulated output voltage exceeding the direct conduction threshold voltage;
- an override circuit configured to disable the direct conduction avoidance circuit based on the input voltage of the switching power supply being below an override threshold voltage and to enable the direct conduction avoidance circuit based on the input voltage of the switching power supply being above the override threshold voltage; and
- an error amplifier configured to sense the regulated output voltage and a reference voltage, the error amplifier generating a compensation signal based on the regulated output voltage and the reference voltage, the compensation signal being combined with the direct conduction avoidance signal to create the power demand signal.

19. The device of claim 18, including a filter network configured to filter the compensation signal and provide a filtered compensation signal, the filtered compensation signal being combined with the direct conduction avoidance signal to create the power demand signal.

* * * * *